United States Patent
Kim et al.

(10) Patent No.: US 9,736,659 B2
(45) Date of Patent: Aug. 15, 2017

(54) METHOD FOR ALLOCATING BROADCAST CHANNEL, METHOD FOR TRANSMITTING AND RECEIVING BROADCAST CHANNEL SIGNAL, AND DEVICE FOR SUPPORTING SAME

(71) Applicant: LG ELECTRONICS INC., Seoul (KR)

(72) Inventors: Jinmin Kim, Seoul (KR); Kitae Kim, Seoul (KR); Jaehoon Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 80 days.

(21) Appl. No.: 14/773,740

(22) PCT Filed: Mar. 17, 2014

(86) PCT No.: PCT/KR2014/002223
§ 371 (c)(1),
(2) Date: Sep. 8, 2015

(87) PCT Pub. No.: WO2014/148783
PCT Pub. Date: Sep. 25, 2014

(65) Prior Publication Data
US 2016/0029179 A1 Jan. 28, 2016

Related U.S. Application Data

(60) Provisional application No. 61/802,725, filed on Mar. 17, 2013.

(51) Int. Cl.
*H04W 4/06* (2009.01)
*H04W 72/04* (2009.01)
(Continued)

(52) U.S. Cl.
CPC .......... *H04W 4/06* (2013.01); *H04N 21/2385* (2013.01); *H04W 56/0015* (2013.01); *H04W 72/005* (2013.01)

(58) Field of Classification Search
CPC .............. H04L 5/0053; H04W 72/042; H04W 72/0446; H04W 72/0453
See application file for complete search history.

(56) References Cited

U.S. PATENT DOCUMENTS

2010/0008317 A1    1/2010  Bhattad et al.
2010/0182903 A1*   7/2010  Palanki ................ H04L 1/0041
                                                              370/225
(Continued)

FOREIGN PATENT DOCUMENTS

GB    2493780        2/2013
JP    2003-199137    7/2003
(Continued)

OTHER PUBLICATIONS

European Patent Office Application Serial No. 14769651.2, Search Report dated Sep. 21, 2016, 9 pages.
(Continued)

*Primary Examiner* — Scott M Sciacca
(74) *Attorney, Agent, or Firm* — Lee Hong Degerman Kang & Waimey

(57) ABSTRACT

Disclosed are a novel method for allocating a broadcast channel and a novel method for transmitting and receiving a broadcast channel signal in a wireless access system, and devices for supporting the same. The method for receiving a broadcast signal in a wireless access system, according to one embodiment of the present invention, comprises the steps of: periodically receiving one or more broadcast signals during a preset transmission time interval; obtaining a transmission position and a transmission pattern for the one or more broadcast signals in a transmission time interval;

(Continued)

and obtaining system information included in the broadcast signals on the basis the transmission position and/or the transmission pattern.

20 Claims, 14 Drawing Sheets

(51) Int. Cl.
  *H04N 21/2385* (2011.01)
  *H04W 72/00* (2009.01)
  *H04W 56/00* (2009.01)

(56) References Cited

U.S. PATENT DOCUMENTS

| | | | |
|---|---|---|---|
| 2011/0013730 A1* | 1/2011 | Mansson | H04B 7/0689 375/340 |
| 2011/0164707 A1* | 7/2011 | Luo | H04L 1/0045 375/341 |
| 2012/0198305 A1* | 8/2012 | Abu-Surra | H03M 13/116 714/758 |
| 2012/0250620 A1 | 10/2012 | Hu | |
| 2012/0263089 A1 | 10/2012 | Gupta et al. | |
| 2013/0003672 A1* | 1/2013 | Dinan | H04L 1/00 370/329 |
| 2013/0007814 A1 | 1/2013 | Cherian et al. | |
| 2013/0064099 A1 | 3/2013 | Kim et al. | |
| 2013/0121249 A1* | 5/2013 | Ji | H04W 4/001 370/328 |

FOREIGN PATENT DOCUMENTS

| | | |
|---|---|---|
| KR | 10-2008-0092963 | 10/2008 |
| KR | 10-2009-0082967 | 8/2009 |

OTHER PUBLICATIONS

PCT International Application No. PCT/KR2014/002223, Written Opinion of the International Searching Authority dated Jul. 8, 2014, 18 pages.

* cited by examiner

FIG. 9
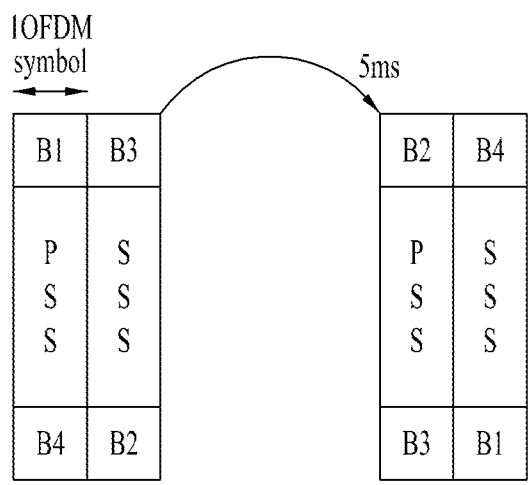
(a)
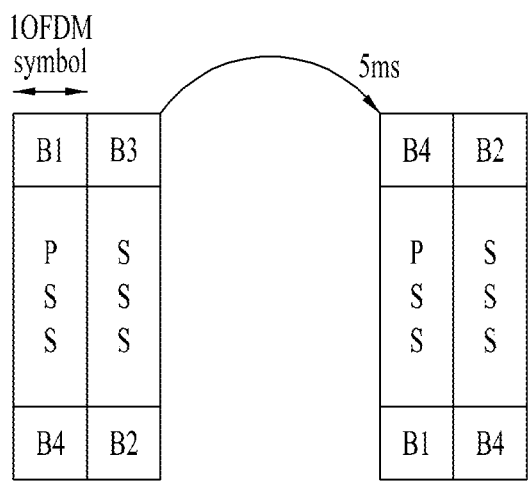
(b)

METHOD FOR ALLOCATING BROADCAST CHANNEL, METHOD FOR TRANSMITTING AND RECEIVING BROADCAST CHANNEL SIGNAL, AND DEVICE FOR SUPPORTING SAME

CROSS-REFERENCE TO RELATED APPLICATIONS

This application is the National Stage filing under 35 U.S.C. 371 of International Application No. PCT/KR2014/002223, filed on Mar. 17, 2014, which claims the benefit of U.S. Provisional Application No. 61/802,725, filed on Mar. 17, 2013, the contents of which are all hereby incorporated by reference herein in their entirety.

TECHNICAL FIELD

The present invention relates to a new method for allocating a broadcast channel, a new method for transmitting and receiving a broadcast channel signal, and a device for supporting the same in a radio access system.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention devised to solve the problem lies in a method for configuring a new broadcast channel.

Another object of the present invention devised to solve the problem lies in a method for configuring a new broadcast channel in a small cell environment using a super high frequency band.

Another object of the present invention devised to solve the problem lies in a method for newly defining a broadcast channel to reduce a used resource region.

Another object of the present invention devised to solve the problem lies in a method for transmitting a broadcast channel signal, which is capable of obtaining diversity gain while reducing overhead upon transmitting the broadcast channel signal.

Another object of the present invention devised to solve the problem lies in a device for supporting such methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention discloses a new method for allocating a broadcast channel, a new method for transmitting and receiving a broadcast channel signal, and a device for supporting the same in a radio access system.

The object of the present invention can be achieved by providing a method for receiving a broadcast signal in a radio access system including periodically receiving one or more broadcast signals during a predetermined transmission time interval (TTI), acquiring transmission locations and transmission patterns of the one or more broadcast signals in the TTI, and acquiring system information included in the broadcast signals based on one or more of the transmission locations and transmission patterns.

In another aspect of the present invention, provided herein is a user equipment (UE) for receiving a broadcast signal in a radio access system including a receiver and a processor configured to support reception of the broadcast signal. At this time, the processor is configured to control the receiver to periodically receive one or more broadcast signals during a predetermined transmission time interval (TTI), to acquire transmission locations and transmission patterns of the one or more broadcast signals in the TTI, and to acquire system information included in the broadcast signals based on one or more of the transmission locations and transmission patterns.

At this time, the broadcast signals may include four broadcast signals.

The four broadcast signals may include information on most significant bits of a system frame number field, and one or more of the transmission locations and transmission patterns may indicate information on least significant bits of the system frame number field.

The four broadcast signals may be transmitted via a region adjacent to a region, in which a synchronization signal is transmitted, on a time or frequency axis.

The one or more broadcast signals may be transmitted along with the synchronization signal.

In another aspect of the present invention, provided herein is a method for transmitting a broadcast signal in a radio access system including allocating a broadcast channel region of one or more broadcast signals and periodically broadcasting the one or more broadcast signals during a predetermined transmission time interval (TTI), wherein the one or more broadcast signals are broadcast in a predetermined transmission pattern.

In another aspect of the present invention, provided herein is a base station for transmitting a broadcast signal in a radio access system including a transmitter and a processor configured to transmit the broadcast signal. At this time, the processor is configured to allocate a broadcast channel region of one or more broadcast signals and to control the transmitter to periodically broadcast the one or more broadcast signals during a predetermined transmission time interval (TTI), and the one or more broadcast signals are broadcast in a predetermined transmission pattern.

The broadcast signals may include four broadcast signals.

The four broadcast signals may include information on most significant bits of a system frame number field, and one or more of the transmission locations and transmission patterns may indicate information on least significant bits of the system frame number field.

The four broadcast signals may be transmitted via a region adjacent to a region, in which a synchronization signal is transmitted, on a time or frequency axis.

The one or more broadcast signals may be transmitted along with the synchronization signal.

In addition, the broadcast signals may include four broadcast signals.

The four broadcast signals may include information on most significant bits of a system frame number field, and one or more of the transmission locations and transmission patterns may indicate information on least significant bits of the system frame number field.

The four broadcast signals may be transmitted via a region adjacent to a region, in which a synchronization signal is transmitted, on a time or frequency axis.

The one or more broadcast signals may be transmitted along with the synchronization signal.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First, it is possible to provide a method for configuring a new broadcast channel and a new method for broadcasting a broadcast channel signal by using the embodiments of the present invention.

Second, it is possible to transmit a broadcast channel signal suitable for a small cell environment by using a new broadcast channel and a new broadcast channel transmission method in the small cell environment.

Third, it is possible to reduce a resource region used to allocate a broadcast channel region.

Fourth, it is possible to obtain diversity gain in a time and/or frequency domain while reducing overhead upon transmitting a broadcast channel signal.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention. In the drawings:

FIG. 9 is a diagram showing one method for allocating a physical broadcast channel;

BEST MODE

Figure 1:
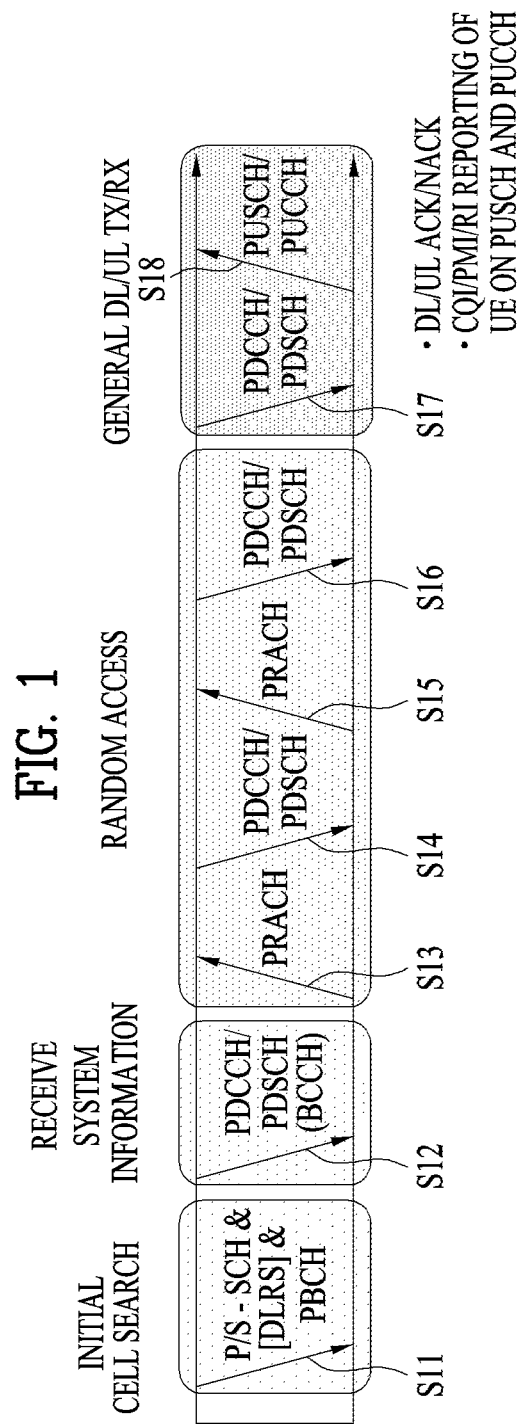
FIG. 1 illustrates physical channels and a general signal transmission method using the physical channels, which may be used in embodiments of the present invention.

The following embodiments of the present invention provide a new method for allocating a broadcast channel, a new method for transmitting and receiving a broadcast channel signal and devices for supporting the same.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DL.

The embodiments of the present invention may be supported by standard specifications disclosed for at least one of wireless access systems including an Institute of Electrical and Electronics Engineers (IEEE) 802.xx system, a 3rd Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

For example, the term used in embodiments of the present invention, 'synchronization signal' is interchangeable with a synchronization sequence, a training symbol or a synchronization preamble in the same meaning.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

1.1 System Overview

FIG. 1 illustrates physical channels and a general method using the physical channels, which may be used in embodiments of the present invention.

When a UE is powered on or enters a new cell, the UE performs initial cell search (S11). The initial cell search involves acquisition of synchronization to an eNB. Specifically, the UE synchronizes its timing to the eNB and acquires information such as a cell Identifier (ID) by receiving a Primary Synchronization Channel (P-SCH) and a Secondary Synchronization Channel (S-SCH) from the eNB.

Then the UE may acquire information broadcast in the cell by receiving a Physical Broadcast Channel (PBCH) from the eNB.

During the initial cell search, the UE may monitor a DL channel state by receiving a Downlink Reference Signal (DL RS).

After the initial cell search, the UE may acquire more detailed system information by receiving a Physical Downlink Control Channel (PDCCH) and receiving a Physical Downlink Shared Channel (PDSCH) based on information of the PDCCH (S12).

To complete connection to the eNB, the UE may perform a random access procedure with the eNB (S13 to S16). In the random access procedure, the UE may transmit a preamble on a Physical Random Access Channel (PRACH) (S13) and may receive a PDCCH and a PDSCH associated with the PDCCH (S14). In the case of contention-based random access, the UE may additionally perform a contention resolution procedure including transmission of an additional PRACH (S15) and reception of a PDCCH signal and a PDSCH signal corresponding to the PDCCH signal (S16).

After the above procedure, the UE may receive a PDCCH and/or a PDSCH from the eNB (S17) and transmit a Physical Uplink Shared Channel (PUSCH) and/or a Physical Uplink Control Channel (PUCCH) to the eNB (S18), in a general UL/DL signal transmission procedure.

Control information that the UE transmits to the eNB is generically called Uplink Control Information (UCI). The UCI includes a Hybrid Automatic Repeat and reQuest Acknowledgement/Negative Acknowledgement (HARQ-ACK/NACK), a Scheduling Request (SR), a Channel Quality Indicator (CQI), a Precoding Matrix Index (PMI), a Rank Indicator (RI), etc.

In the LTE system, UCI is generally transmitted on a PUCCH periodically. However, if control information and traffic data should be transmitted simultaneously, the control information and traffic data may be transmitted on a PUSCH. In addition, the UCI may be transmitted aperiodically on the PUSCH, upon receipt of a request/command from a network.

Figure 2:
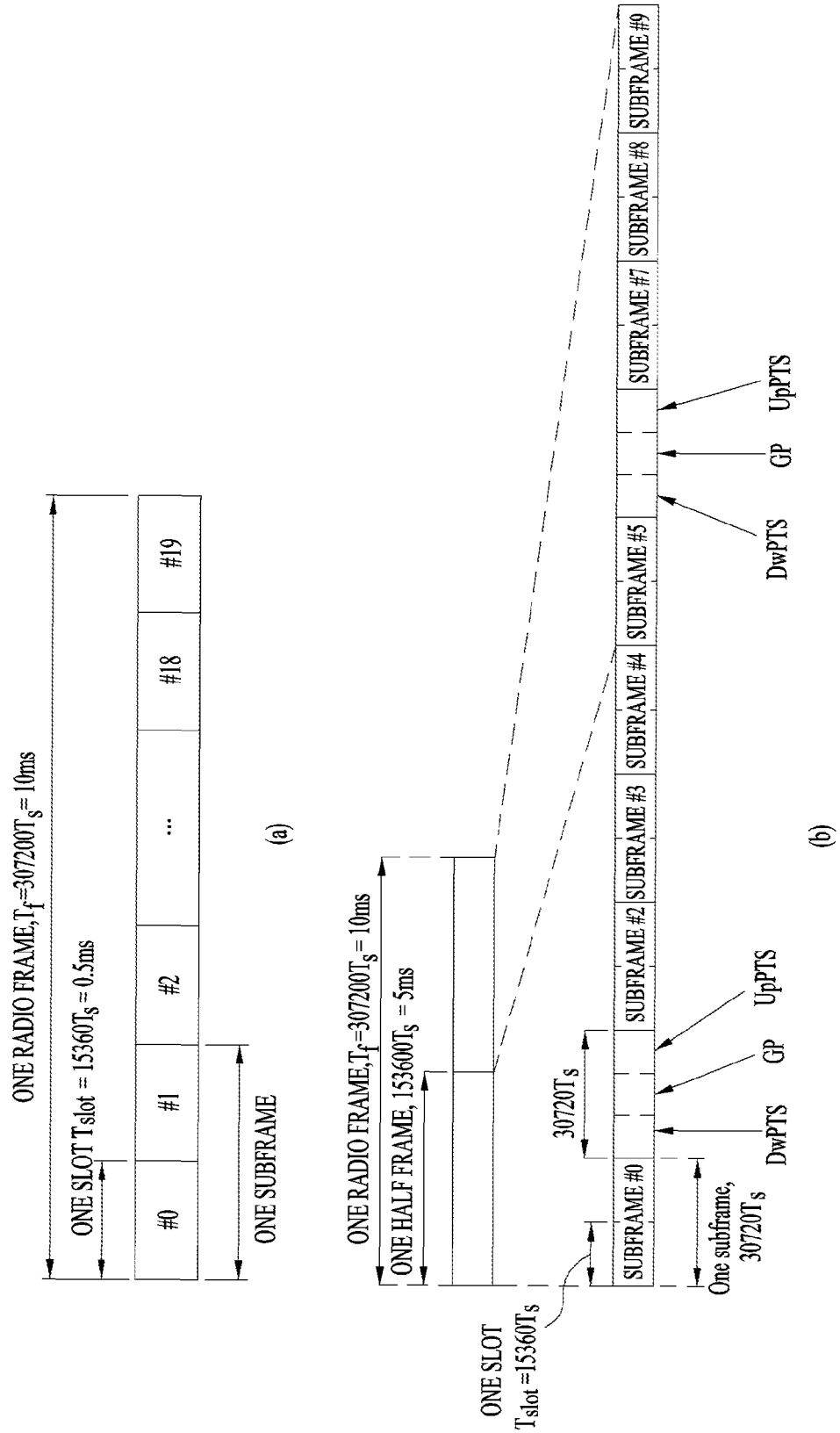
FIG. 2 illustrates radio frame structures used in embodiments of the present invention.

FIG. 2 illustrates exemplary radio frame structures used in embodiments of the present invention.

FIG. 2(a) illustrates frame structure type 1. Frame structure type 1 is applicable to both a full Frequency Division Duplex (FDD) system and a half FDD system.

One radio frame is 10 ms ($T_f = 307200 \cdot T_s$) long, including equal-sized 20 slots indexed from 0 to 19. Each slot is 0.5 ms ($T_{slot} = 15360 \cdot T_s$) long. One subframe includes two successive slots. An $i^{th}$ subframe includes $2i^{th}$ and $(2i+1)^{th}$ slots. That is, a radio frame includes 10 subframes. A time required for transmitting one subframe is defined as a Transmission Time Interval (TTI). Ts is a sampling time given as $T_s = 1/(15 \text{ kHz} \times 2048) = 3.2552 \times 10^{-8}$ (about 33 ns). One slot includes a plurality of Orthogonal Frequency Division Multiplexing (OFDM) symbols or SC-FDMA symbols in the time domain by a plurality of Resource Blocks (RBs) in the frequency domain.

A slot includes a plurality of OFDM symbols in the time domain. Since OFDMA is adopted for DL in the 3GPP LTE system, one OFDM symbol represents one symbol period. An OFDM symbol may be called an SC-FDMA symbol or symbol period. An RB is a resource allocation unit including a plurality of contiguous subcarriers in one slot.

In a full FDD system, each of 10 subframes may be used simultaneously for DL transmission and UL transmission during a 10-ms duration. The DL transmission and the UL transmission are distinguished by frequency. On the other hand, a UE cannot perform transmission and reception simultaneously in a half FDD system.

The above radio frame structure is purely exemplary. Thus, the number of subframes in a radio frame, the number of slots in a subframe, and the number of OFDM symbols in a slot may be changed.

FIG. 2(b) illustrates frame structure type 2. Frame structure type 2 is applied to a Time Division Duplex (TDD) system. One radio frame is 10 ms ($T_f=307200 \cdot T_s$) long, including two half-frames each having a length of 5 ms ($=153600 \cdot T_s$) long. Each half-frame includes five subframes each being 1 ms ($=30720 \cdot T_s$) long. An $i^{th}$ subframe includes $2i^{th}$ and $(2i+1)^{th}$ slots each having a length of 0.5 ms ($T_{slot}=15360 \cdot T_s$). $T_s$ is a sampling time given as $T_s=1/(15 \text{ kHz} \times 2048)=3.2552 \times 10^{-8}$ (about 33 ns).

A type-2 frame includes a special subframe having three fields, Downlink Pilot Time Slot (DwPTS), Guard Period (GP), and Uplink Pilot Time Slot (UpPTS). The DwPTS is used for initial cell search, synchronization, or channel estimation at a UE, and the UpPTS is used for channel estimation and UL transmission synchronization with a UE at an eNB. The GP is used to cancel UL interference between a UL and a DL, caused by the multi-path delay of a DL signal.

[Table 1] below lists special subframe configurations (DwPTS/GP/UpPTS lengths).

Each element of the resource grid is referred to as a Resource Element (RE). An RB includes 12×7 REs. The number of RBs in a DL slot, NDL depends on a DL transmission bandwidth. A UL slot may have the same structure as a DL slot.

Figure 4:
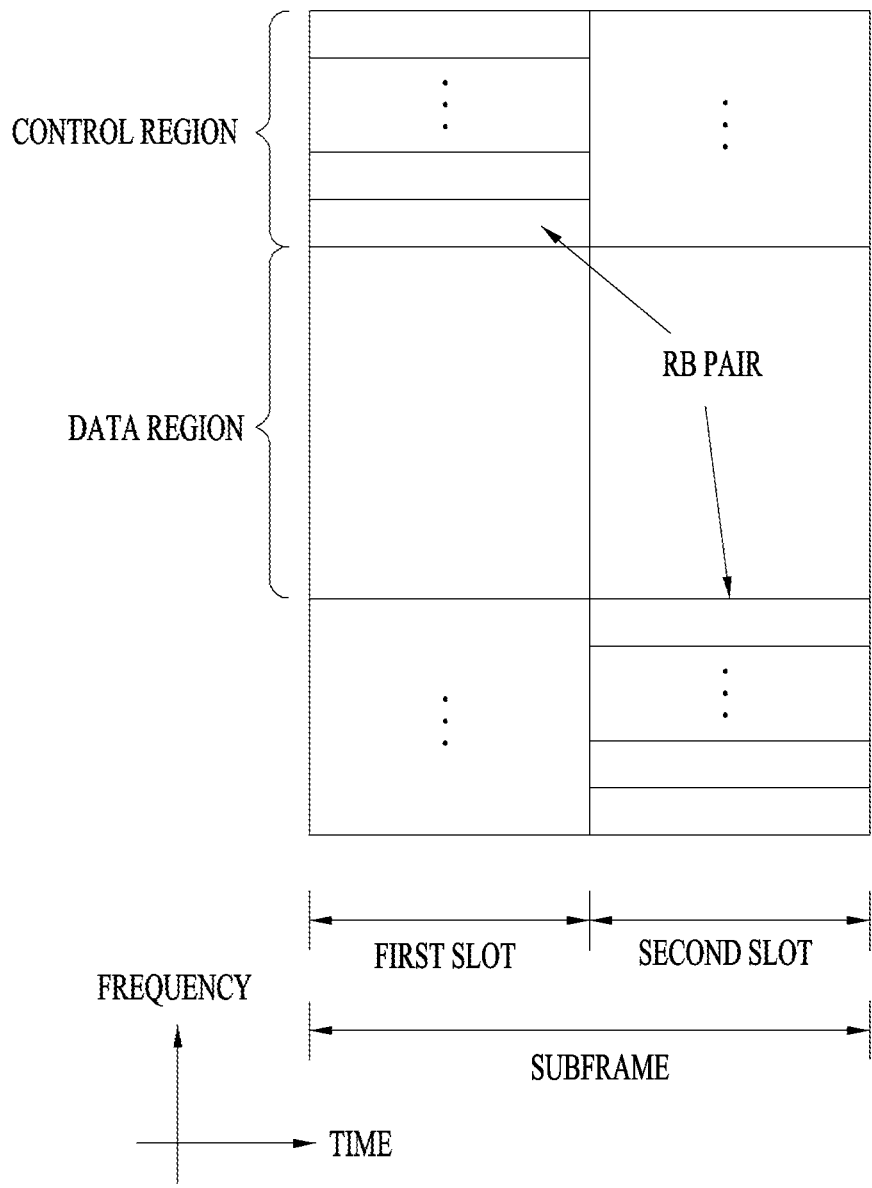
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe may be divided into a control region and a data region in the frequency domain. A PUCCH carrying UCI is allocated to the control region and a PUSCH carrying user data is allocated to the data region. To maintain a single carrier property, a UE does not transmit a PUCCH and a PUSCH simultaneously. A pair of RBs in a subframe are allocated to a PUCCH for a UE. The RBs of the RB pair occupy different subcarriers in two slots. Thus it is said that the RB pair frequency-hops over a slot boundary.

Figure 5:
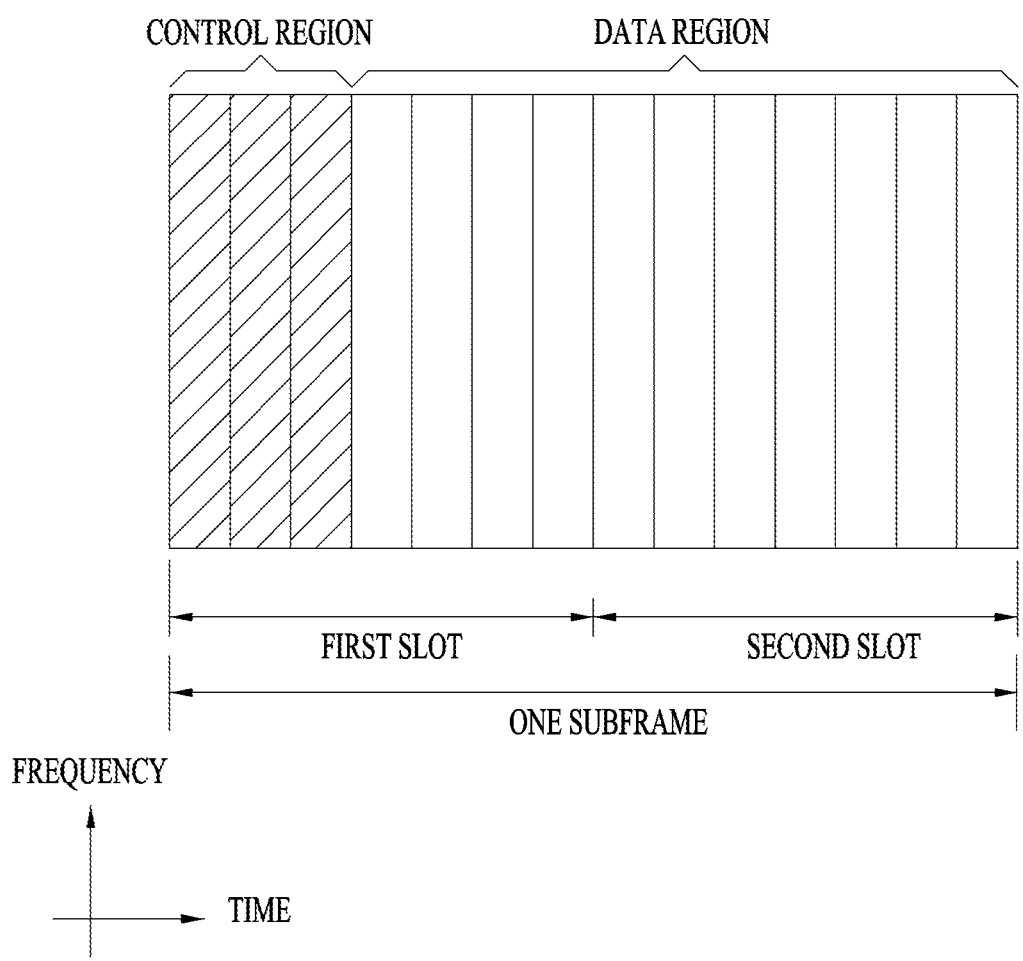
FIG. 5 illustrates a structure of a DL subframe, which may be used in embodiments of the present invention.

FIG. 5 illustrates a structure of a DL subframe that may be used in embodiments of the present invention.

Referring to FIG. 5, up to three OFDM symbols of a DL subframe, starting from OFDM symbol 0 are used as a control region to which control channels are allocated and the other OFDM symbols of the DL subframe are used as a data region to which a PDSCH is allocated. DL control channels defined for the 3GPP LTE system include a Physical Control Format Indicator Channel (PCFICH), a PDCCH, and a Physical Hybrid ARQ Indicator Channel (PHICH).

The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. Control information carried on the PDCCH is called Downlink Control Information (DCI). The DCI transports UL resource assignment information, DL resource assignment information, or UL Transmission (Tx) power control commands for a UE group.

2. Carrier Aggregation (CA) Environment 2.1 CA Overview

TABLE 1

| | | Normal cyclic prefix in downlink | | | | |
|---|---|---|---|---|---|---|
| | | UpPTS | | | Extended cyclic prefix in downlink | |
| | | Normal | Extended | | UpPTS | |
| Special subframe configuration | DwPTS | cyclic prefix in uplink | cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5120 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | — | — | — |
| 8 | 24144 · $T_s$ | | | — | — | — |

Figure 3:
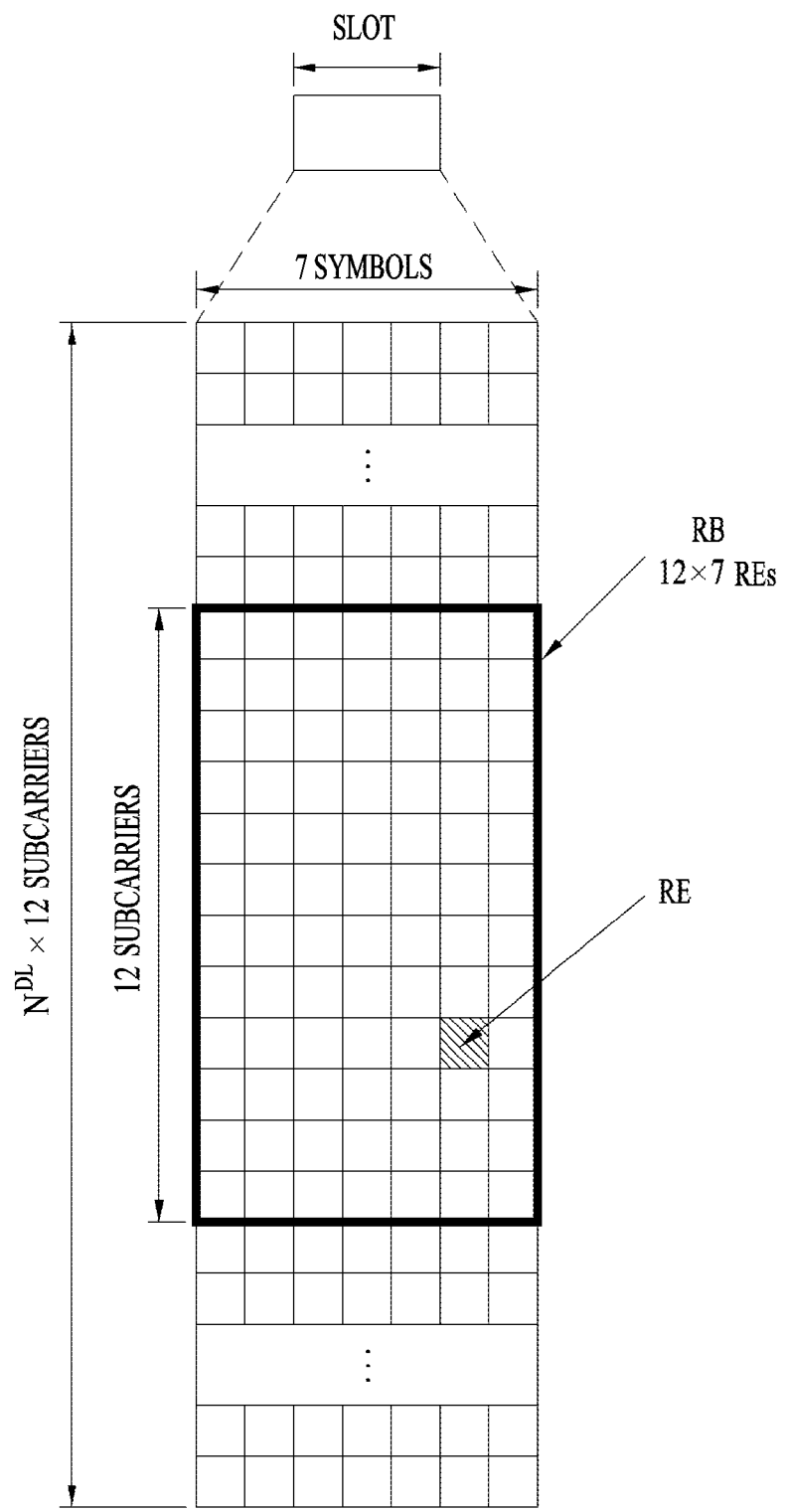
FIG. 3 illustrates a structure of a DownLink (DL) resource grid for the duration of one DL slot, which may be used in embodiments of the present invention.

FIG. 3 illustrates an exemplary structure of a DL resource grid for the duration of one DL slot, which may be used in embodiments of the present invention.

Referring to FIG. 3, a DL slot includes a plurality of OFDM symbols in the time domain. One DL slot includes 7 OFDM symbols in the time domain and an RB includes 12 subcarriers in the frequency domain, to which the present invention is not limited.

A 3GPP LTE system (conforming to Rel-8 or Rel-9) (hereinafter, referred to as an LTE system) uses Multi-Carrier Modulation (MCM) in which a single Component Carrier (CC) is divided into a plurality of bands. In contrast, a 3GPP LTE-A system (hereinafter, referred to an LTE-A system) may use CA by aggregating one or more CCs to support a broader system bandwidth than the LTE system. The term CA is interchangeably used with carrier combining, multi-CC environment, or multi-carrier environment.

In the present invention, multi-carrier means CA (or carrier combining). Herein, CA covers aggregation of contiguous carriers and aggregation of non-contiguous carriers. The number of aggregated CCs may be different for a DL and a UL. If the number of DL CCs is equal to the number of UL CCs, this is called symmetric aggregation. If the number of DL CCs is different from the number of UL CCs, this is called asymmetric aggregation. The term CA is interchangeable with carrier combining, bandwidth aggregation, spectrum aggregation, etc.

The LTE-A system aims to support a bandwidth of up to 100 MHz by aggregating two or more CCs, that is, by CA. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A CA system of the present invention may support CA by defining a new bandwidth irrespective of the bandwidths used in the legacy system.

There are two types of CA, intra-band CA and inter-band CA. Intra-band CA means that a plurality of DL CCs and/or UL CCs are successive or adjacent in frequency. In other words, the carrier frequencies of the DL CCs and/or UL CCs are positioned in the same band. On the other hand, an environment where CCs are far away from each other in frequency may be called inter-band CA. In other words, the carrier frequencies of a plurality of DL CCs and/or UL CCs are positioned in different bands. In this case, a UE may use a plurality of Radio Frequency (RF) ends to conduct communication in a CA environment.

The LTE-A system adopts the concept of cell to manage radio resources. The above-described CA environment may be referred to as a multi-cell environment. A cell is defined as a pair of DL and UL CCs, although the UL resources are not mandatory. Accordingly, a cell may be configured with DL resources alone or DL and UL resources.

For example, if one serving cell is configured for a specific UE, the UE may have one DL CC and one UL CC. If two or more serving cells are configured for the UE, the UE may have as many DL CCs as the number of the serving cells and as many UL CCs as or fewer UL CCs than the number of the serving cells, or vice versa. That is, if a plurality of serving cells are configured for the UE, a CA environment using more UL CCs than DL CCs may also be supported.

CA may be regarded as aggregation of two or more cells having different carrier frequencies (center frequencies). Herein, the term 'cell' should be distinguished from 'cell' as a geographical area covered by an eNB. Hereinafter, intra-band CA is referred to as intra-band multi-cell and inter-band CA is referred to as inter-band multi-cell.

In the LTE-A system, a Primacy Cell (PCell) and a Secondary Cell (SCell) are defined. A PCell and an SCell may be used as serving cells. For a UE in RRC_CONNECTED state, if CA is not configured for the UE or the UE does not support CA, a single serving cell including only a PCell exists for the UE. On the contrary, if the UE is in RRC_CONNECTED state and CA is configured for the UE, one or more serving cells may exist for the UE, including a PCell and one or more SCells.

Serving cells (PCell and SCell) may be configured by an RRC parameter. A physical-layer ID of a cell, PhysCellId is an integer value ranging from 0 to 503. A short ID of an SCell, SCellIndex is an integer value ranging from 1 to 7. A short ID of a serving cell (PCell or SCell), ServeCellIndex is an integer value ranging from 1 to 7. If ServeCellIndex is 0, this indicates a PCell and the values of ServeCellIndex for SCells are pre-assigned. That is, the smallest cell ID (or cell index) of ServeCellIndex indicates a PCell.

A PCell refers to a cell operating in a primary frequency (or a primary CC). A UE may use a PCell for initial connection establishment or connection reestablishment. The PCell may be a cell indicated during handover. In addition, the PCell is a cell responsible for control-related communication among serving cells configured in a CA environment. That is, PUCCH allocation and transmission for the UE may take place only in the PCell. In addition, the UE may use only the PCell in acquiring system information or changing a monitoring procedure. An Evolved Universal Terrestrial Radio Access Network (E-UTRAN) may change only a PCell for a handover procedure by a higher-layer RRCConnectionReconfiguration message including mobilityControlInfo to a UE supporting CA.

An SCell may refer to a cell operating in a secondary frequency (or a secondary CC). Although only one PCell is allocated to a specific UE, one or more SCells may be allocated to the UE. An SCell may be configured after RRC connection establishment and may be used to provide additional radio resources. There is no PUCCH in cells other than a PCell, that is, in SCells among serving cells configured in the CA environment.

When the E-UTRAN adds an SCell to a UE supporting CA, the E-UTRAN may transmit all system information related to operations of related cells in RRC_CONNECTED state to the UE by dedicated signaling. Changing system information may be controlled by releasing and adding a related SCell. Herein, a higher-layer RRCConnectionReconfiguration message may be used. The E-UTRAN may transmit a dedicated signal having a different parameter for each cell rather than it broadcasts in a related SCell.

After an initial security activation procedure starts, the E-UTRAN may configure a network including one or more SCells by adding the SCells to a PCell initially configured during a connection establishment procedure. In the CA environment, each of a PCell and an SCell may operate as a CC. Hereinbelow, a Primary CC (PCC) and a PCell may be used in the same meaning and a Secondary CC (SCC) and an SCell may be used in the same meaning in embodiments of the present invention.

2.2 Cross Carrier Scheduling

Two scheduling schemes, self-scheduling and cross carrier scheduling are defined for a CA system, from the perspective of carriers or serving cells. Cross carrier scheduling may be called cross CC scheduling or cross cell scheduling.

In self-scheduling, a PDCCH (carrying a DL grant) and a PDSCH are transmitted in the same DL CC or a PUSCH is transmitted in a UL CC linked to a DL CC in which a PDCCH (carrying a UL grant) is received.

In cross carrier scheduling, a PDCCH (carrying a DL grant) and a PDSCH are transmitted in different DL CCs or a PUSCH is transmitted in a UL CC other than a UL CC linked to a DL CC in which a PDCCH (carrying a UL grant) is received.

Cross carrier scheduling may be activated or deactivated UE-specifically and indicated to each UE semi-statically by higher-layer signaling (e.g. RRC signaling).

If cross carrier scheduling is activated, a Carrier Indicator Field (CIF) is required in a PDCCH to indicate a DL/UL CC in which a PDSCH/PUSCH indicated by the PDCCH is to be transmitted. For example, the PDCCH may allocate PDSCH resources or PUSCH resources to one of a plurality of CCs by the CIF. That is, when a PDCCH of a DL CC allocates PDSCH or PUSCH resources to one of aggregated DL/UL CCs, a CIF is set in the PDCCH. In this case, the DCI formats of LTE Release-8 may be extended according to the CIF. The CIF may be fixed to three bits and the position of the CIF may be fixed irrespective of a DCI format size. In addition, the LTE Release-8 PDCCH structure (the same coding and resource mapping based on the same CCEs) may be reused.

On the other hand, if a PDCCH transmitted in a DL CC allocates PDSCH resources of the same DL CC or allocates PUSCH resources in a single UL CC linked to the DL CC, a CIF is not set in the PDCCH. In this case, the LTE Release-8 PDCCH structure (the same coding and resource mapping based on the same CCEs) may be used.

If cross carrier scheduling is available, a UE needs to monitor a plurality of PDCCHs for DCI in the control region of a monitoring CC according to the transmission mode and/or bandwidth of each CC. Accordingly, an appropriate SS configuration and PDCCH monitoring are needed for the purpose.

In the CA system, a UE DL CC set is a set of DL CCs scheduled for a UE to receive a PDSCH, and a UE UL CC set is a set of UL CCs scheduled for a UE to transmit a PUSCH. A PDCCH monitoring set is a set of one or more DL CCs in which a PDCCH is monitored. The PDCCH monitoring set may be identical to the UE DL CC set or may be a subset of the UE DL CC set. The PDCCH monitoring set may include at least one of the DL CCs of the UE DL CC set. Or the PDCCH monitoring set may be defined irrespective of the UE DL CC set. DL CCs included in the PDCCH monitoring set may be configured to always enable self-scheduling for UL CCs linked to the DL CCs. The UE DL CC set, the UE UL CC set, and the PDCCH monitoring set may be configured UE-specifically, UE group-specifically, or cell-specifically.

If cross carrier scheduling is deactivated, this implies that the PDCCH monitoring set is always identical to the UE DL CC set. In this case, there is no need for signaling the PDCCH monitoring set. However, if cross carrier scheduling is activated, the PDCCH monitoring set is preferably defined within the UE DL CC set. That is, the eNB transmits a PDCCH only in the PDCCH monitoring set to schedule a PDSCH or PUSCH for the UE.

Figure 6:
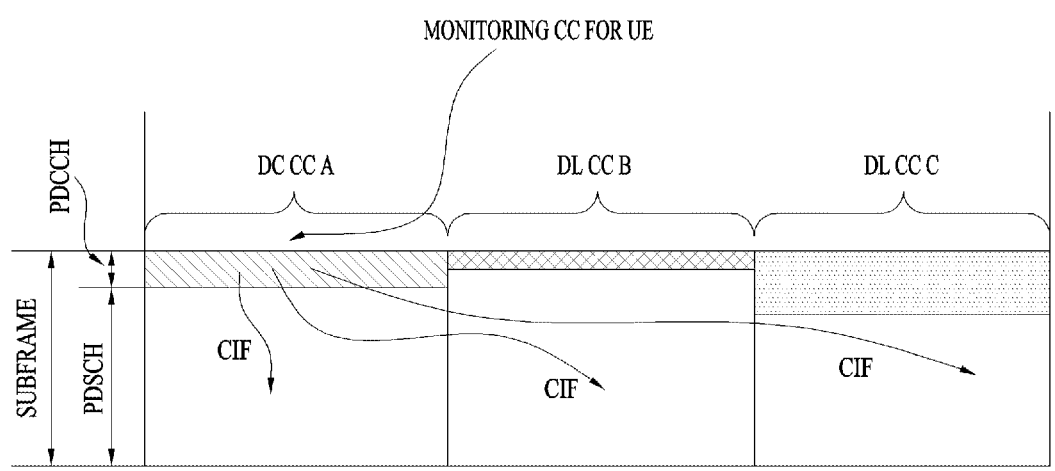
FIG. 6 illustrates a cross carrier-scheduled subframe structure in the LTE-A system, which is used in embodiments of the present invention.

FIG. 6 illustrates a cross carrier-scheduled subframe structure in the LTE-A system, which is used in embodiments of the present invention.

Referring to FIG. 6, three DL CCs are aggregated for a DL subframe for LTE-A UEs. DL CC 'A' is configured as a PDCCH monitoring DL CC. If a CIF is not used, each DL CC may deliver a PDCCH that schedules a PDSCH in the same DL CC without a CIF. On the other hand, if the CIF is used by higher-layer signaling, only DL CC 'A' may carry a PDCCH that schedules a PDSCH in the same DL CC 'A' or another CC. Herein, no PDCCH is transmitted in DL CC 'B' and DL CC 'C' that are not configured as PDCCH monitoring DL CCs.

3. Broadcast Channel Transmission Method 3.1 Initial Access Procedure

An initial access procedure may include a cell discovery procedure, a system information acquisition procedure and a random access procedure.

Figure 7:
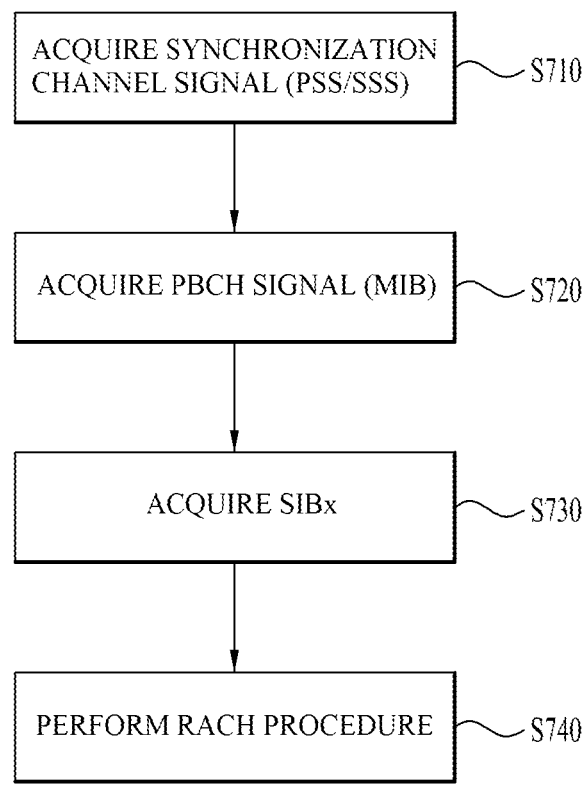
FIG. 7 is a diagram showing an example of an initial access procedure used in an LTE/LTE-A system.

FIG. 7 is a diagram showing an example of an initial access procedure used in an LTE/LTE-A system.

A UE may receive synchronization signals (e.g., a primary synchronization signal (PSS) and a secondary synchronization signal (SSS)) transmitted from an eNB to acquire downlink synchronization information. The synchronization signals are transmitted twice per frame (at an interval of 10 ms). That is, the synchronization signals are transmitted at an interval of 5 ms (S710).

The downlink synchronization information acquired in step S710 may include a physical cell ID (PCID), downlink time and frequency synchronization and cyclic prefix (CP) length information.

Thereafter, the UE receives a physical broadcast channel (PBCH) signal transmitted via a PBCH. At this time, the PBCH signal is repeatedly transmitted four times in different scrambling sequences in four frames (that is, 40 ms) (S720).

The PBCH signal includes a master information block (MIB) as system information. One MIB has a total size of 24 bits and 14 bits thereof are used to indicate physical HARQ indicator channel (PHICH) configuration information, downlink cell bandwidth (dl-bandwidth) information and system frame number (SFN). The remaining 10 bits thereof are spare bits.

Thereafter, the UE may receive different system information blocks (SIBs) transmitted from the eNB to acquire the remaining system information. The SIBs are transmitted on a DL-SCH and presence/absence of the SIB is checked by a PDCCH signal masked with system information radio network temporary identifiers (SI-RNTIs) (S730).

System information block type 1 (SIB1) of the SIBs includes parameters necessary to determine whether the cell is suitable for cell selection and information on scheduling of the other SIBs on a time axis. System information block type 2 (SIB2) includes common channel information and shared channel information. SIB3 to SIB8 include cell reselection related information, inter-frequency information, intra-frequency information, etc. SIB9 is used to deliver the name of a home eNodeB (HeNB) and SIB10 to SIB12 include an Earthquake and Tsunami Warning Service (ETWS) notification and a commercial mobile alert system (CMAS) message. SIB13 includes MBMS related control information.

The UE may perform the random access procedure when steps S710 to S730 are performed. In particular, the UE may acquire parameters for transmitting a physical random access channel (PRACH) signal upon receiving SIB2 of the above-described SIBs. Accordingly, the UE may generate and transmit a PRACH signal using the parameters included in SIB2 to perform the random access procedure with the eNB (S740).

3.2 Physical Broadcast Channel (PBCH)

In an LTE/LTE-A system, a PBCH is used for MIB transmission. Hereinafter, a method for configuring a PBCH will be described.

A block of bits $b(0), \ldots, b(M_{bit}-1)$ is scrambled with a cell-specific sequence prior to modulation to calculate a block of scrambled bits $\tilde{b}(0), \ldots, \tilde{b}(M_{bit}-1)$. At this time, $M_{bit}$ denotes the number of bits transmitted on the PBCH and is 1920 bits for normal cyclic prefix and 1728 bits for extended cyclic prefix.

Equation 1 below shows one of methods for scrambling the block of bits.

$$\tilde{b}(i)=(b(i)+c(i)) \bmod 2 \qquad \text{Equation 1}$$

In Equation 1, c(i) denotes a scrambling sequence. The scrambling sequence is initialized with $c_{init}=N_{ID}^{cell}$ in each radio frame fulfilling $n_f \bmod 4=0$.

The block of scrambled bits $\tilde{b}(0), \ldots, \tilde{b}(M_{bit}-1)$ is modulated to calculate a block of complex-valued modulation symbols $d(0), \ldots, d(M_{symb}-1)$. At this time, a modulation scheme applicable to a physical broadcast channel is quadrature phase shift keying (QPSK).

The block of modulation symbols $d(0), \ldots, d(M_{symb}-1)$ is mapped to one or more layers. At this time, $M_{symb}^{(0)} = M_{symb}$. Thereafter, the block of modulation symbols is precoded to calculate a block of vectors $y(i)=[y^{(0)}(i) \ldots y^{(P-1)}(i)]^T$. At this time, $i=0, \ldots, M_{symb}-1$. In addition, $y^{(p)}(i)$ denotes a signal for an antenna port p, where $p=0, \ldots, P-1$ and $P \in \{1, 2, 4\}$. p denotes the number of an antenna port for a cell-specific reference signal.

The block of complex-valued symbols $y^{(p)}(0), \ldots, y^{(p)}(M_{symb}-1)$ for each antenna port is transmitted during 4 consecutive radio frames starting in each radio frame fulfilling $n_f \bmod 4=0$. In addition, the block of complex-valued symbols is mapped to resource elements (k, l) not reserved for transmission of reference signals in increasing order of first the index k, then the index l of slot 1 of subframe 0 and finally the radio frame number. The resource element indices are given in Equation 2.

$$k = \frac{N_{RB}^{DL} N_{sc}^{RB}}{2} - 36 + k', k' = 0, 1, \ldots, 71$$
$$l = 0, 1, \ldots, 3$$

Equation 2

Resource elements for reference signals are excluded from mapping. The mapping operation assumes that cell-specific reference signals for antenna ports 0 to 3 are present irrespective of the actual configuration. The UE assumes that the resource elements assumed to be reserved for reference signals in the mapping operation but not used for transmission of reference signals are not available for PDSCH transmission. The UE does not make any other assumptions about these resource elements.

3.3 MIB (Master Information Block)

The MIB is system information transmitted on a PBCH. That is, the MIB includes system information transmitted via a BCH. A signaling radio bearer is not applicable to the MIB, a radio link control-service access point (RLC-SAP) is in a transparent mode (TM), a logical channel is a broadcast control channel (BCCH), and the MIB is transmitted from an E-UTRAN to a UE. Table 2 below shows an example of an MIB format.

TABLE 2

```
-- ASN1START
MasterInformationBlock ::=    SEQUENCE {
    dl-Bandwidth              ENUMERATED {
                                  n6, n15, n25, n50, n75, n100},
    phich-Config              PHICH-Config,
    systemFrameNumber         BIT STRING (SIZE (8)),
    spare                     BIT STRING (SIZE (10))
}
-- ASN1STOP
```

The MIB includes a downlink bandwidth (dl-Bandwidth) parameter, a PHICH configuration (PHICH-config) parameter, a system frame number (systemFrameNumber) parameter, and spare bits.

The downlink bandwidth parameter indicates 16 different transmission bandwidth configurations $N_{RB}$. For example, n6 corresponds to 6 resource blocks and n15 corresponds to 15 resource blocks. The PHICH configuration parameter indicates a PHICH configuration necessary to receive a control signal on a PDCCH necessary to receive a DL-SCH. The system frame number (SFN) parameter defines 8 most significant bits (MSBs) of the SFN. At this time, 2 least significant bits (LSBs) of the SFN are indirectly acquired via decoding of the PBCH. For example, timing of 40 ms PBCH TTI indicates 2 LSBs. This will be described in detail with reference to FIG. 8.

Figure 8:
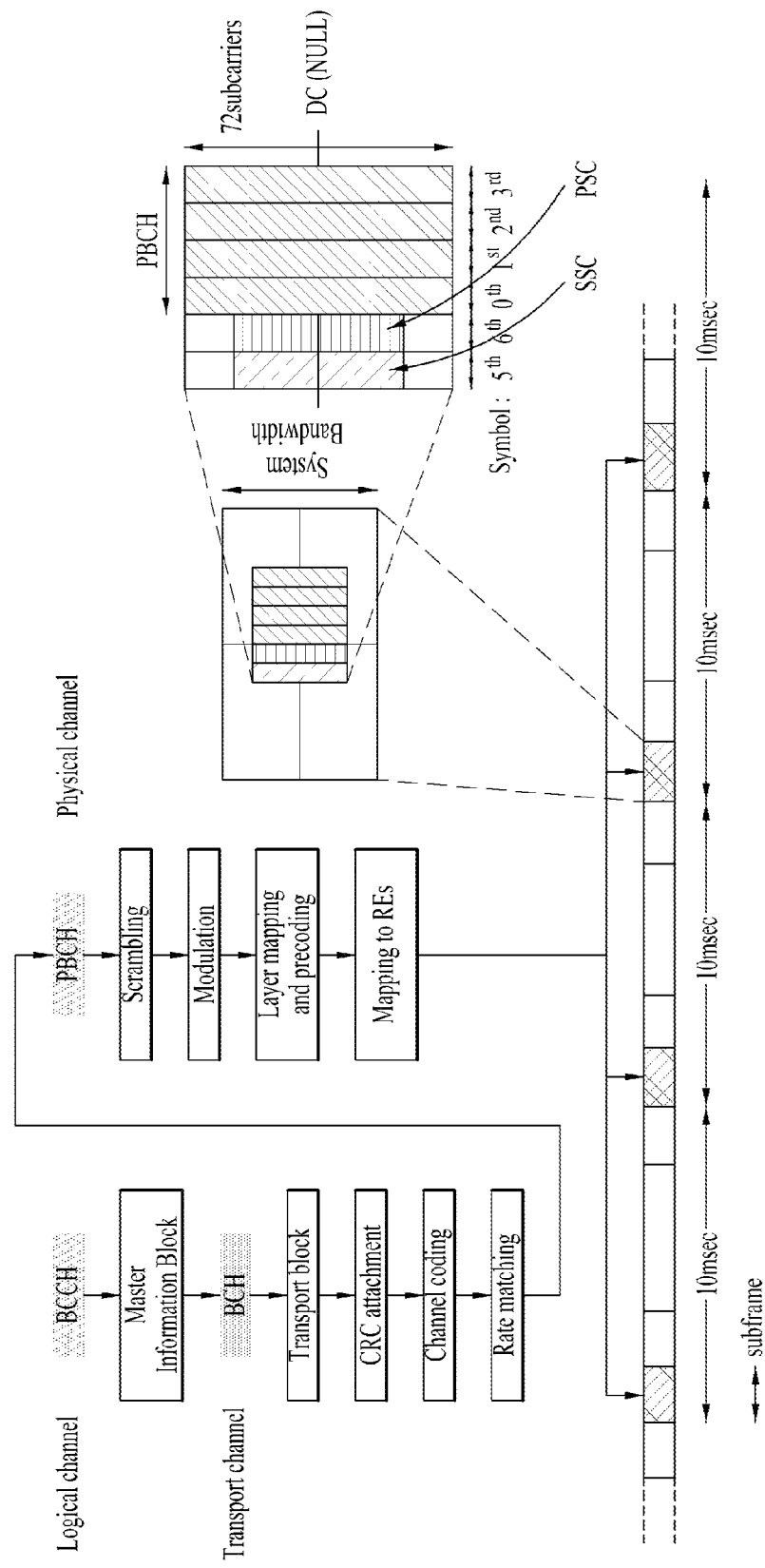
FIG. 8 is a diagram showing one method for transmitting a broadcast channel signal.

FIG. 8 is a diagram showing one method for transmitting a broadcast channel signal.

Referring to FIG. 8, an MIB transmitted via a BCCH, which is a logical channel, is delivered via a BCH which is a transport channel. At this time, the MIB is mapped to a transport block, and an MIB transport block is attached with CRC, is subjected to a channel coding and rate matching procedure and is delivered to a PBCH which is a physical channel. Thereafter, the MIB is subjected to scrambling and modulation procedures and a layer mapping and precoding procedure and then is mapped to a resource element (RE). That is, the same PBCH signal is scrambled and transmitted in different scrambling sequences during a period of 40 ms (that is, four frames). Accordingly, the UE may detect one PBCH every 40 ms via blind decoding and estimate the remaining 2 bits of the SFN.

For example, in a PBCH TTI of 40 ms, the LSB of the SFN is set to "00" when a PBCH signal is transmitted on a first radio frame, is set to "01" when the PBCH signal is transmitted on a second radio frame, is set to "10" when the PBCH signal is transmitted on a third radio frame, and is a set to "11" when the PBCH signal is transmitted on a last radio frame.

In addition, referring to FIG. 8, the PBCH may be allocated to 72 subcarriers located at the center of the first four OFDM symbols of a second slot (slot #1) of a first subframe (subframe #0) of each frame. At this time, a subcarrier region, to which the PBCH is allocated, is always a region corresponding to 72 center subcarriers irrespective of cell bandwidth. This allows detection of a PBCH even when downlink cell bandwidth is not known.

In addition, a primary synchronization channel (PSC), in which a primary synchronization signal (PSS) is transmitted, has a TTI of 5 ms and is allocated to a last symbol of a first slot (slot #0) of subframes #0 and #5 of each frame. A secondary synchronization channel (SSC), on which a secondary synchronization signal (SSS) is transmitted, has a TTI of 5 ms and is allocated to the second to last symbol (that is, a previous symbol of the PSS) of the same slot. In addition, the PSC and the SSC always occupy 72 center subcarriers irrespective of cell bandwidth and are allocated to 62 subcarriers.

3.4 Broadcast Channel Allocation and Broadcast Channel Signal Transmission Method Meanwhile, in a super high frequency wireless communication system or a small cell environment, an environment having small cell coverage is established. In the super high frequency wireless communication system, path loss is greater than that of a legacy cellular band due to propagation characteristics. Accordingly, in the super high frequency wireless communication system, cell coverage is less than that of the legacy cellular system. Therefore, in the small cell environment using the super high frequency band, the SNR of a signal received by the UE may have a relatively high value. This may require relatively low robustness when an eNB transmits a PBCH.

In the below-described embodiments of the present invention, a method of acquiring diversity gain while reducing overhead upon transmitting a PBCH is proposed. In addition, in the embodiments of the present invention, the MIB may include one or more of downlink bandwidth (dl-Bandwidth) information, PHICH configuration (phich-config) information and system frame number (SFN) information. However, in consideration of the small cell environment, system information different from that of the LTE/LTE-A system may be included in the MIB.

FIG. 9 is a diagram showing one method for allocating a physical broadcast channel.

In the embodiments of the present invention, a PBCH may be divided into four regions and allocated. A legacy network system allocates a PBCH to four OFDM symbols independent of synchronization channels (that is, PSS/SSS). In a small cell environment, since cell coverage is small, even when a PBCH signal is transmitted in a state of increasing a coding rate thereof, a UE may stably receive the PBCH signal. Accordingly, in the embodiments of the present invention, unlike a conventional method, a small number of resource elements may be allocated to the PBCH without using all four OFDM symbols.

For example, a network system may allocate a PBCH to OFDM symbols to which PSSs/SSSs are allocated. In addition, the PBCH may be allocated adjacent to the synchronization channels such as PSSs/SSSs in the frequency domain. That is, as shown in FIG. 9, four PBCHs B1 to B4 may be allocated near the allocation region of the PSSs/SSSs. In FIG. 9, B1, B2, B3, and B4 mean allocated physical broadcast channel regions. In addition, when broadcast signals are transmitted via B1 to B4, B1 to B4 may mean broadcast signals transmitted via the broadcast channels, respectively.

Assuming that the PSS/SSS signal is transmitted once every 5 ms in the small cell environment, the eNB may transmit a PBCH signal at the same transmission period as the PSS/SSS signal in order to obtain maximum time diversity with respect to the PBCH signal. In addition, the eNB may reverse and transmit four PBCH signals in the time and/or frequency domain in order to obtain maximum time/frequency diversity with respect to the PBCH signal.

FIG. 9(a) shows an embodiment of reversing and allocating a PBCH region in the time and frequency domain and FIG. 9(b) shows an embodiment of reversing and allocating a PBCH region in the frequency domain.

At this time, B1 to B4 allocated to the broadcast channels (first broadcast channel to fourth broadcast channel) may be four channel regions divided from one self-decodable PBCH. Alternatively, each of B1 to B4 may be configured to be self-decodable. That is, in the former case, the UE may perform decoding after receiving all of signals B1 to B4, thereby acquiring the MIB. However, in the latter case, the UE may acquire the MIB after receiving at least one of B1 to B4.

The allocation patterns of the PBCH shown in FIG. 9 are exemplary and B1 to B4 may be mapped to four PBCH allocation regions in different allocation patterns. That is, the allocation order of B to B4 may be different from that of FIG. 9.

In addition, B1 to B4, which are PBCHs, may be allocated to 10 subcarriers not used for PSS/SSS transmission in 72 subcarriers occupied by the PSSs/SSSs (see FIG. 8). That is, B1 to B4 may be allocated to one OFDM symbol region and five subcarrier regions. Of course, the allocation locations of B1 to B4 may be determined according to the method described with reference to FIG. 9 and the sizes of the resource regions, to which B1 to B4 are allocated, may change according to the amount of information of the MIB.

Figure 10:
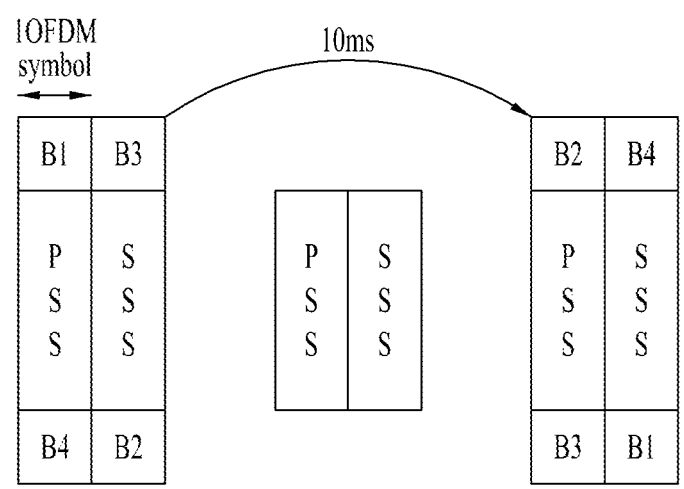
FIG. 10 is a diagram showing another method for allocating the physical broadcast channel.

FIG. 10 is a diagram showing another of the methods for allocating the physical broadcast channel.

FIG. 10 is fundamentally equal to FIG. 9 in the method for configuring the PBCH and is different from FIG. 9 in the method for configuring the transmission period of the PBCH. For example, in consideration compatibility with the LTE/LTE-A system, the PBCH may be allocated at a period of 10 ms which is the transmission period of the legacy PBCH.

In FIG. 10, assume that the PSS/SSS, which is the synchronization channel, is allocated at a period of 5 ms, equally to the legacy system and the PBCH is allocated at a period of 10 ms. Alternatively, in a small cell environment, the transmission period of the PBCH may dynamically change. For example, the PBCH may be allocated at a period of N ms and N may be defined as a system parameter.

Referring to FIG. 10, the synchronization channel and the PBCH are adjacently allocated on a frequency axis in a subframe, to which the PBCH is allocated, and only the synchronization channel is transmitted in a subframe, to which the PBCH is not allocated.

For example, the synchronization channels are allocated to 62 subcarriers in the last two OFDM symbols of the first slot, equally to the conventional method. When the PBCH is allocated, the PBCH may be allocated to 10 subcarriers except the region, to which the synchronization channels are allocated, of the 72 center subcarriers.

Figure 11:
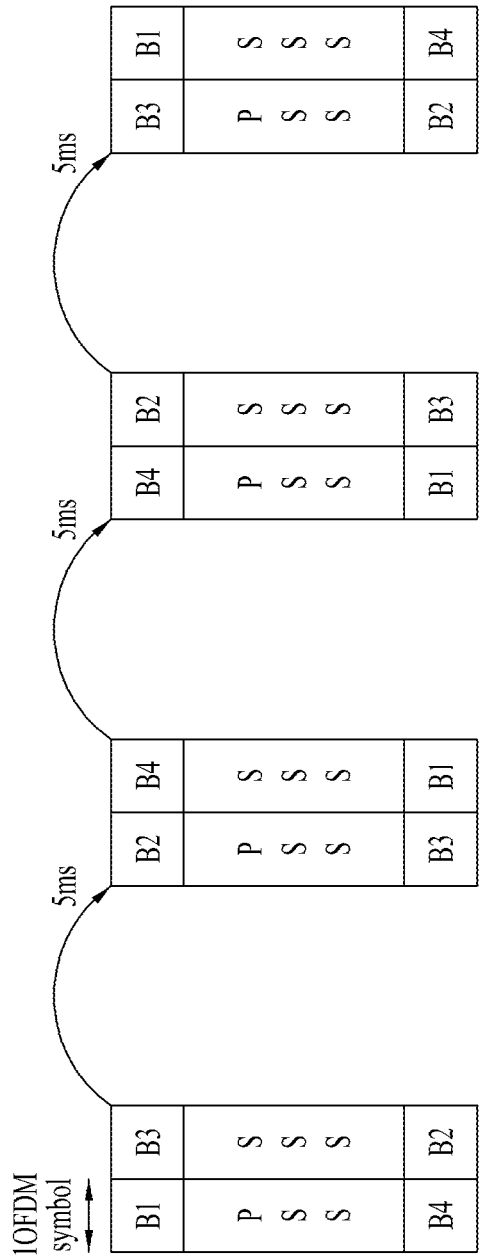
FIG. 11 is a diagram showing one method for implicitly transmitting system information using an allocation pattern of a physical broadcast channel.

FIG. 11 is a diagram showing one method for implicitly transmitting system information using an allocation pattern of a physical broadcast channel.

In an LTE/LTE-A system, a UE may perform blind decoding (BD) with respect to a PBCH so as to acquire the number of antennas used to transmit PCFHICH/PDCCH/PBCH signals and information on the last two bits of an SFN based on the detection location of the PBCH.

Even in new PBCHs defined in the embodiments of the present invention, it is possible to acquire LSB 2 bits of the SFN and antenna information using the method equal to the conventional method. In addition, it is possible to implicitly transmit 2 bit or more LSB of the SFN or other information via the allocation locations of B1 to B4.

For example, as shown in FIG. 11, when the PBCH may be transmitted at a period of 5 ms and a PBCH TTI is 20 ms, the UE may implicitly acquire information on which PBCH has precedence within 20 ms using the transmission patterns of the divided PBCHs (B1 to B4) transmitted during 20 ms.

At this time, CRCs are attached to the PBCHs (that is, B1 to B4) transmitted at the period of 5 ms and the UE may perform blind decoding with respect to the allocation patterns of the PBCHs changed at the period of 5 ms so as to acquire the order of transmitted PBCHs (e.g., SFN LSB 2 bits), information on the number of transmit antennas and/or other system information.

As another example, since the allocation regions of the PBCHs become smaller than those of the legacy cellular system, it is possible to further reduce the size of the MBS of the SFN included in the MIB. At this time, the reduced size of the MBS may be further compensated for by the allocation location patterns of B1 to B4. For example, the UE may detect the subframes, to which B1 to B4 are allocated, so as to acquire 2 bits of the SFN and additionally acquire 2 bits of a next LSB via the allocation patterns of B1 to B4 transmitted within the TTI of the PBCH. In this case, the SFNs transmitted via B1 to B4 may define only 6 MSBs.

Figure 12:
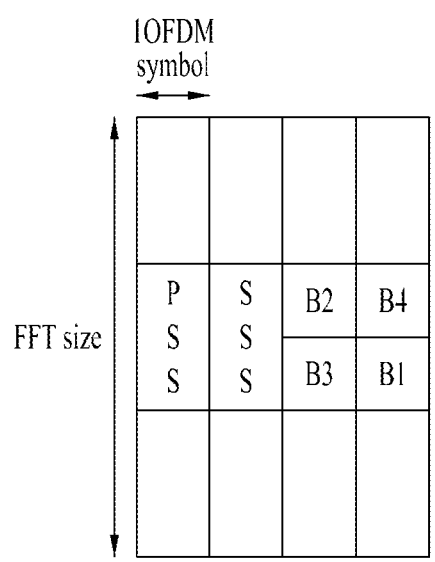
FIG. 12 is a diagram showing another method for allocating the physical broadcast channel.

FIG. 12 is a diagram showing another method for allocating the physical broadcast channel.

FIGS. 9 and 10 show the case in which the PBCH is allocated adjacent to the synchronization signals in the frequency domain. The method for allocating the PBCH adjacent to the synchronization channels in the frequency domain is advantageous in that the UE can simultaneously acquire the synchronization signals and the PBCH. However, when the PBCH and the synchronization channels are adjacently transmitted in the frequency domain, interference may occur between the PBCH and the synchronization signals.

Accordingly, a network system may delay the PBCH in terms of time and allocate the PBCH as shown in FIG. 12. When the PBCH is allocated as shown in FIG. 12, the eNB may obtain transmit diversity in the time and frequency domain upon transmitting B1 to B4 in a specific time and frequency domain.

The reason why the PBCH may be allocated as shown in FIG. 12 is because of the assumption that a reception SNR of the UE is high in a small cell environment. For example, by increasing the channel coding rate of the PBCH, it is possible to reduce the amount of radio resources allocated for the PBCH and to decrease overhead upon PBCH signal transmission.

In the embodiments of the present invention, the PBCH may be configured by divided self-decodable BCHs or may be configured to be self-decodable by a group of divided BCHs. Accordingly, the divided BCHs may be transmitted so as to obtain diversity gain in the time and frequency domain.

Figure 13:
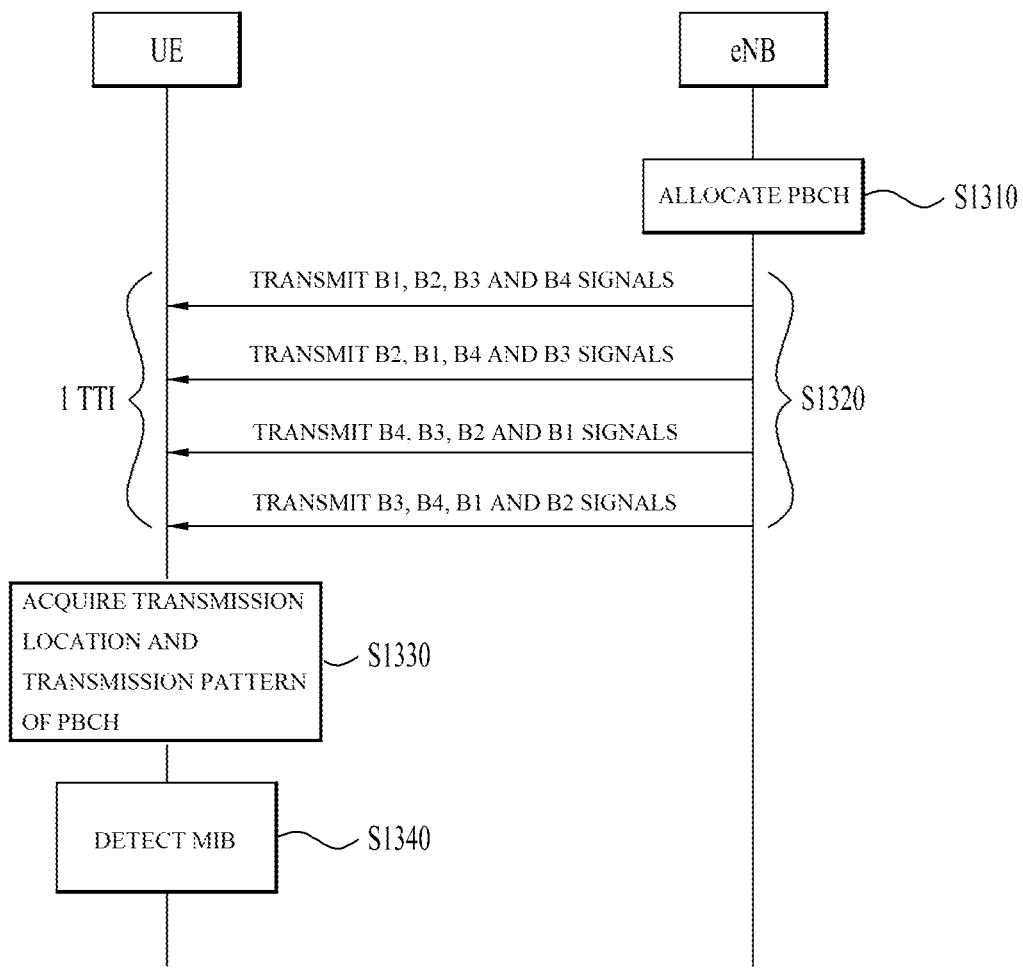
FIG. 13 is a diagram showing an example of a PBCH signal transmission method and an MIB detection method.

FIG. 13 is a diagram showing an example of a PBCH signal transmission method and an MIB detection method.

In FIG. 13, an eNB may allocate a resource region of a PBCH. At this time, the resource allocation method of the BPCH may use the methods described with reference to FIGS. 9 to 12 (S1310).

The eNB may broadcast B1 to B4, which are the PBCH signals, via the allocated PBCH region during the TTI of the PBCH. At this time, the transmission patterns of B1 to B4 may use the method described with reference to FIG. 11. Of course, another transmission pattern may be used according to system requirements (S1320).

In step S1320, the transmission locations of B1 to B4 may be resource regions adjacent to PSSs/SSSs in OFDM symbols, in which the synchronization signals such as the PSSs/SSSs are transmitted, in the frequency domain. When the transmission period of B1 to B4 is 5 ms, the allocation patterns of B1 to B4 may change per transmission period. For a detailed description thereof, refer to the description of FIGS. 9 to 12.

The UE may receive B1 to B4 in the TTI in which the PBCH signal is transmitted. When the PBCH signal is transmitted at a period of 5 ms, the TTI may be set to 20 ms and, when the PBCH signal is transmitted at a period of 10 ms, the TTI may be set to 40 ms.

The UE may acquire the locations of the subframes, in which B1 to B4 are transmitted, (that is, the PBCH transmission locations) and the transmission patterns of B1 to B4 within the TTI (S1330).

At this time, when B1 to B4 are configured to be self-decodable, the UE may receive one or more of B1 to B4 to detect an MIB. Alternatively, the UE may receive all B1 to B4 and perform decoding to detect an MIB. That is, the UE may acquire the MIB based on the information acquired via B1 to B4 and the transmission location and transmission pattern of the PBCH (S1340).

4. Apparatuses

Figure 14:
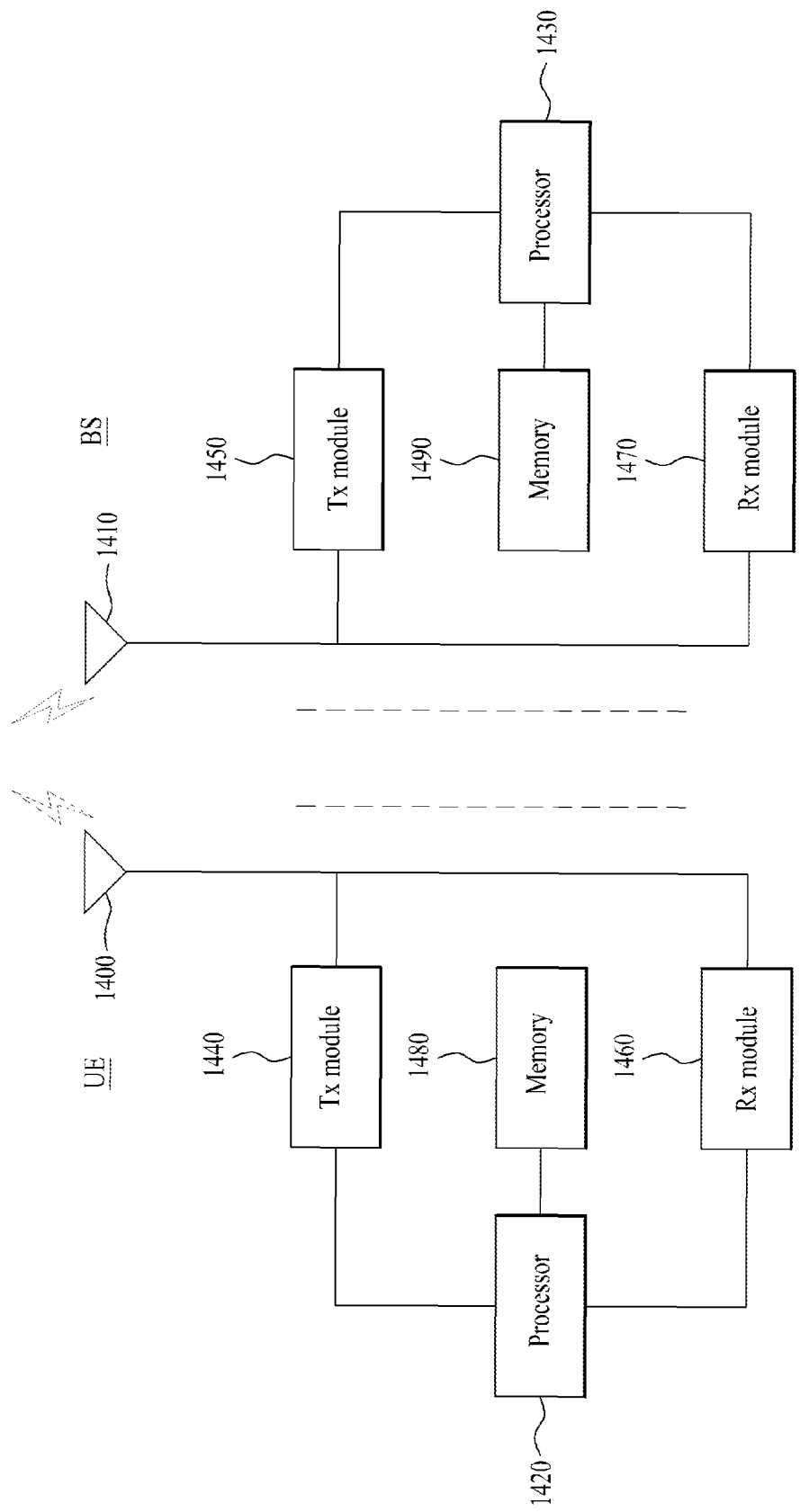
FIG. 14 is a diagram showing a device for implementing the methods described with reference to FIGS. 1 to 13.

Apparatuses illustrated in FIG. 14 are means that can implement the methods described before with reference to FIGS. 1 to 13.

A UE may act as a transmitter on a UL and as a receiver on a DL. A BS may act as a receiver on a UL and as a transmitter on a DL.

That is, each of the UE and the BS may include a Transmitter (Tx) 1440 or 1450 and Receiver (Rx) 1460 or 1470, for controlling transmission and reception of information, data, and/or messages, and an antenna 1400 or 1410 for transmitting and receiving information, data, and/or messages.

Each of the UE and the BS may further include a processor 1420 or 1430 for implementing the afore-described embodiments of the present invention and a memory 1480 or 1490 for temporarily or permanently storing operations of the processor 1420 or 1430.

The embodiments of the present invention may be performed using the components and functions of the above-described UE and BS. For example, the processor of the BS may combine methods disclosed in Chapters 1 to 3 to allocate the PBCH and transmit B1 to B4 with the transmission patterns and at the transmission locations. The UE receives PBCH signals during the TTI in which the PBCH is transmitted. Thereafter, the UE may acquire the MIB included in the received broadcast signals based on the transmission locations and transmission patterns of the received broadcast signals. For such operation, refer to the methods described with reference to FIGS. 9 to 13.

The Tx and Rx of the UE and the BS may perform a packet modulation/demodulation function for data transmission, a high-speed packet channel coding function, OFDMA packet scheduling, TDD packet scheduling, and/or channelization. Each of the UE and the BS of FIG. 14 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 1480 or 1490 and executed by the processor 1440 or 1430. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

Embodiments of the present invention are applicable to various wireless access systems including a 3GPP system, a 3GPP2 system, and/or an IEEE 802.xx system. In addition to these wireless access systems, the embodiments of the present invention are applicable to all technical fields in which the wireless access systems find their applications.

What is claimed is:

1. A method for receiving a broadcast signal in a radio access system, the method comprising:
periodically receiving broadcast signal during a predetermined transmission time interval (TTI);
acquiring transmission locations and transmission patterns of the broadcast signal in the TTI; and
acquiring system information included in the broadcast signal based on one or more of the transmission locations and the transmission patterns,
wherein the transmission locations allocated to the broadcast signal are reversed with the predetermined TTI in a time domain or frequency domain within a broadcast channel region based on the transmission patterns.

2. The method according to claim 1, wherein the broadcast signal includes four divided broadcast signals.

3. The method according to claim 1, wherein:
the broadcast signal includes information on most significant bits of a system frame number field, and
one or more of the transmission locations and the transmission patterns indicates information on least significant bits of the system frame number field.

4. The method according to claim 1, wherein the broadcast signal is transmitted via a region adjacent to a region, in which a synchronization signal is transmitted, on a time or frequency axis.

5. The method according to claim 1, wherein the broadcast signal is transmitted along with the synchronization signal.

6. The method according to claim 1, wherein the broadcast signal is transmitted via a region adjacent to a region, in which a synchronization signal is transmitted, on a time or frequency axis.

7. A method for transmitting a broadcast signal in a radio access system, the method comprising:
allocating a broadcast channel region for broadcast signal; and
periodically broadcasting the broadcast signal during a predetermined transmission time interval (TTI),
wherein transmission locations allocated to the broadcast signal are reversed with the predetermined TTI in a time domain or frequency domain within the broadcast channel region based on transmission patterns.

8. The method according to claim 7, wherein the broadcast signal includes four divided broadcast signals.

9. The method according to claim 7, wherein:
the broadcast signal includes information on most significant bits of a system frame number field, and
one or more of the transmission locations and the transmission patterns indicates information on least significant bits of the system frame number field.

10. The method according to claim 7, wherein the broadcast signal is transmitted along with the synchronization signal.

11. A user equipment (UE) for receiving a broadcast signal in a radio access system, the UE comprising:
a receiver; and
a processor configured to support reception of the broadcast signal,
wherein the processor is configured to:
control the receiver to periodically receive broadcast signal during a predetermined transmission time interval (TTI),
acquire transmission locations and transmission patterns of the one or more broadcast signal in the TTI, and
acquire system information included in the broadcast signal based on one or more of the transmission locations and the transmission patterns,
wherein the transmission locations allocated to the broadcast signal are reversed with the predetermined TTI in a time domain or frequency domain within a broadcast channel region based on the transmission patterns.

12. The UE according to claim 11, wherein the broadcast signal includes four divided broadcast signals.

13. The UE according to claim 11, wherein:
the broadcast signal includes information on most significant bits of a system frame number field, and
one or more of the transmission locations and the transmission patterns indicates information on least significant bits of the system frame number field.

14. The UE according to claim 11, wherein the broadcast signal is transmitted via a region adjacent to a region, in which a synchronization signal is transmitted, on a time or frequency axis.

15. The UE according to claim 11, wherein the broadcast signal is transmitted along with the synchronization signal.

16. A base station for transmitting a broadcast signal in a radio access system, the base station comprising:
a transmitter; and
a processor configured to transmit the broadcast signal,
wherein the processor is configured to:
allocate a broadcast channel region for a broadcast signal and
control the transmitter to periodically broadcast the broadcast signal during a predetermined transmission time interval (TTI),
wherein transmission locations allocated to the broadcast signal are reversed with the predetermined TTI in a time domain or frequency domain within the broadcast channel region based on transmission patterns.

17. The base station according to claim 16, wherein the broadcast signal includes four divided broadcast signals.

18. The base station according to claim 16, wherein:
the broadcast signal includes information on most significant bits of a system frame number field, and
one or more of the transmission locations and the transmission patterns indicates information on least significant bits of the system frame number field.

19. The base station according to claim 16, wherein the broadcast signal is transmitted via a region adjacent to a region, in which a synchronization signal is transmitted, on a time or frequency axis.

20. The base station according to claim 16, wherein the broadcast signal is transmitted along with the synchronization signal.

* * * * *